Figure 1:
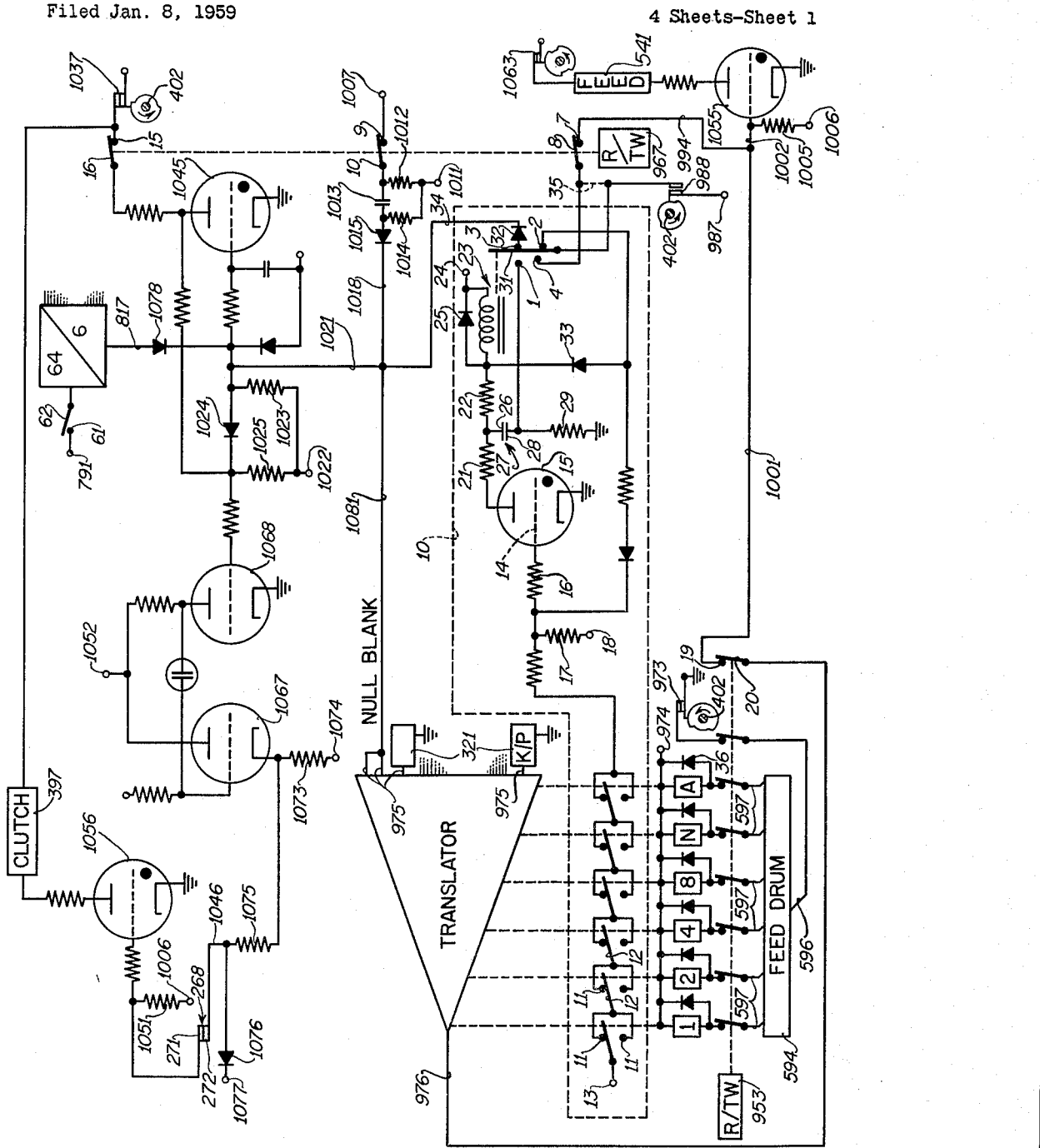

United States Patent Office 2,995,231
Patented Aug. 8, 1961

2,995,231
DATA PROCESSING SYSTEM
Ferdinand G. von Kummer, Bloomfield, and Paul F. Stanley, West Hartford, Conn., assignors to Royal McBee Corporation, Port Chester, N.Y., a corporation of New York
Filed Jan. 8, 1959, Ser. No. 785,614
9 Claims. (Cl. 197—20)

This invention is an improvement on the invention disclosed and claimed in copending application Serial No. 780,090 filed December 12, 1958.

This invention relates to data processing systems wherein signals representative of data are utilized to automatically operate a typewriter; more particularly it relates to a data processing system incorporating circuitry adapted to control the speed of an automatically operated typewriter whenever the data representative of a particular key or function of the typewriter is sensed two or more times in succession; and specifically it relates to a data processing system incorporating circuitry for delaying typewriter operation for an additional time interval over the time interval necessary between successive signals representative of different data whenever successive signals representative of the same data are sensed.

In a data processing system of the type disclosed in said copending application, the typewriter unit limits the rate at which data may be processed. As disclosed in said copending application the release of data from a reader unit whose basic data sensing rate is thirty characters per second is controlled by the typewriter in combination with delay circuitry. The circuitry is such that the data sensing rate is reduced to the optimum rate of typewriter operation, i.e. 12 characters per second. At this rate of operation the typewriter will occasionally, due to various reasons, drop the second character when called upon to perform a repeat character operation. Even though this happens only occasionally it is desirable to prevent its happening altogether.

In accordance with the invention additional delay circuitry is incorporated in the system disclosed in said copending application whereby successively sensed data signals representing repeat operating functions cause the typewriter to operate at six characters per second rather than 12 thereby providing maximum overlap in operation.

As disclosed in said copending application when reading data in the form of codes from a tape, a relay tree is set up in order to translate the character represented by the code. After this character has been processed the tape is advanced to the next character in such time as to allow the state of the relay tree to remain unchanged if the next character is the same as the one previously processed. In accordance with the present invention the state of the relay tree is monitored by a string of form C contacts, one for each level of the tree, in the tree relays. With no break detected in the string of contacts the delay circuit of the instant invention is operative to limit the release of data to six characters per second. If a break is detected normal operation at 12 characters per second is permitted.

A further feature of the invention resides in the fact that the circuit configuration is such that repeat non-operating functions such as blanks and nulls are not effective to cause the additional delay even though no break is detected.

The principal object of the invention is the provision of apparatus for controlling the speed of an automatically controlled typewriter such that if a particular key or function of said typewriter is to be operated two or more times in succession, a delay period will be inserted between such operations which is longer than the normal period allowed between successive operations of different keys or functions.

Another object of the invention is to provide in an apparatus for reducing the rate of operation of an automatically operated typewriter when particular keys thereof are to be operated in succession, circuitry adapted to permit typewriter operation at normal rates when particular non-operating functions are successively sensed.

Figure 2:
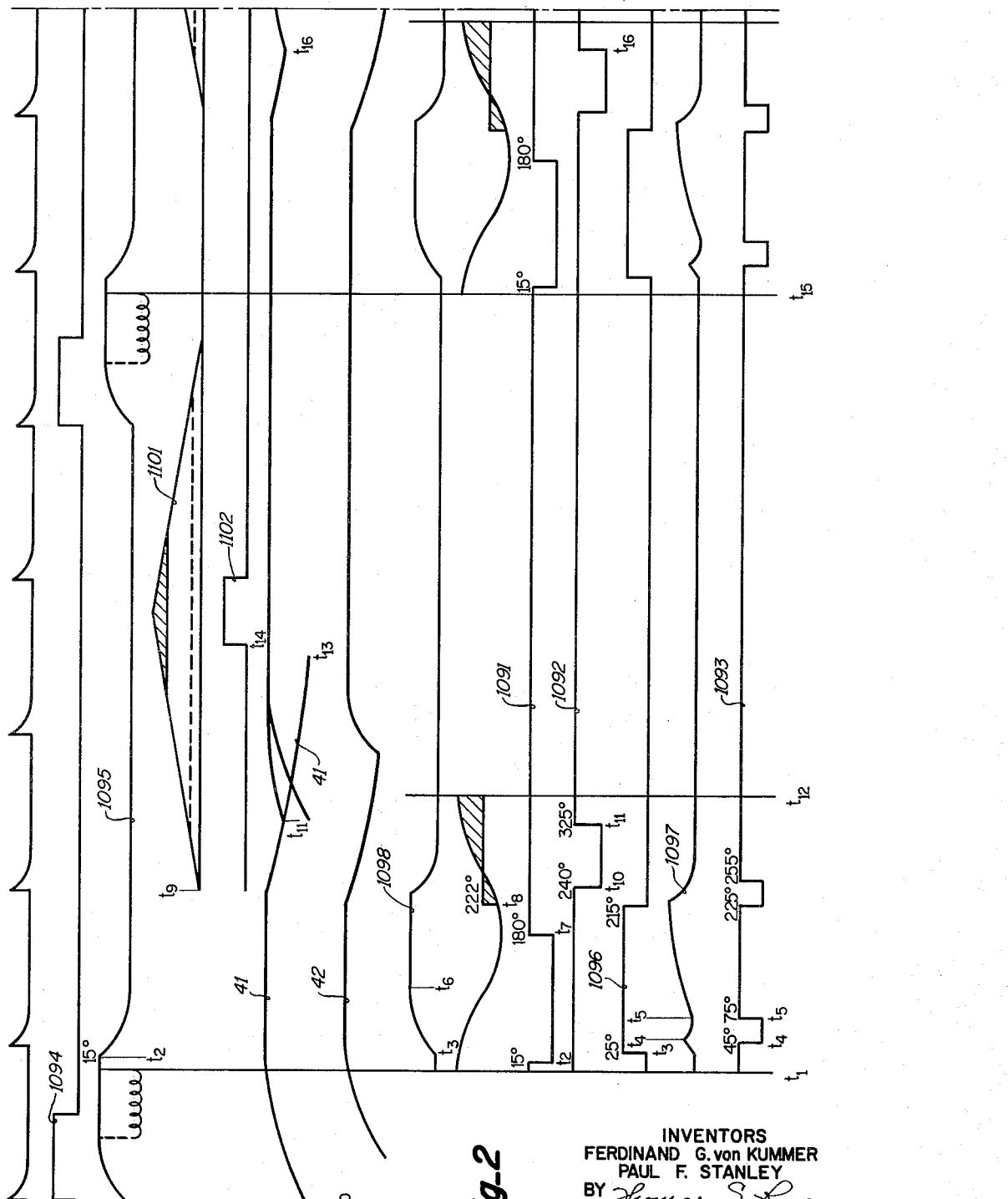
Figure 3:
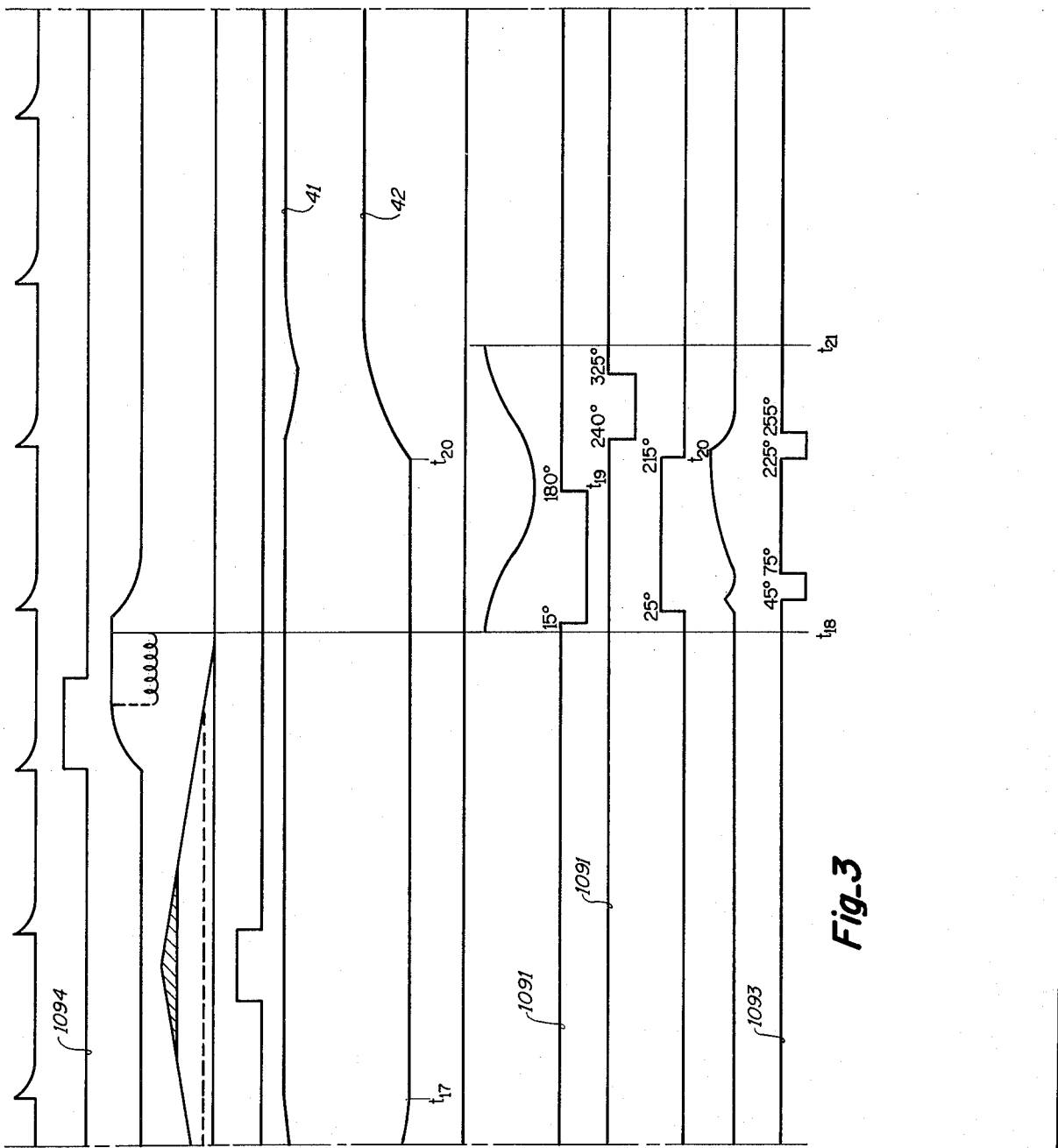
Figure 4:
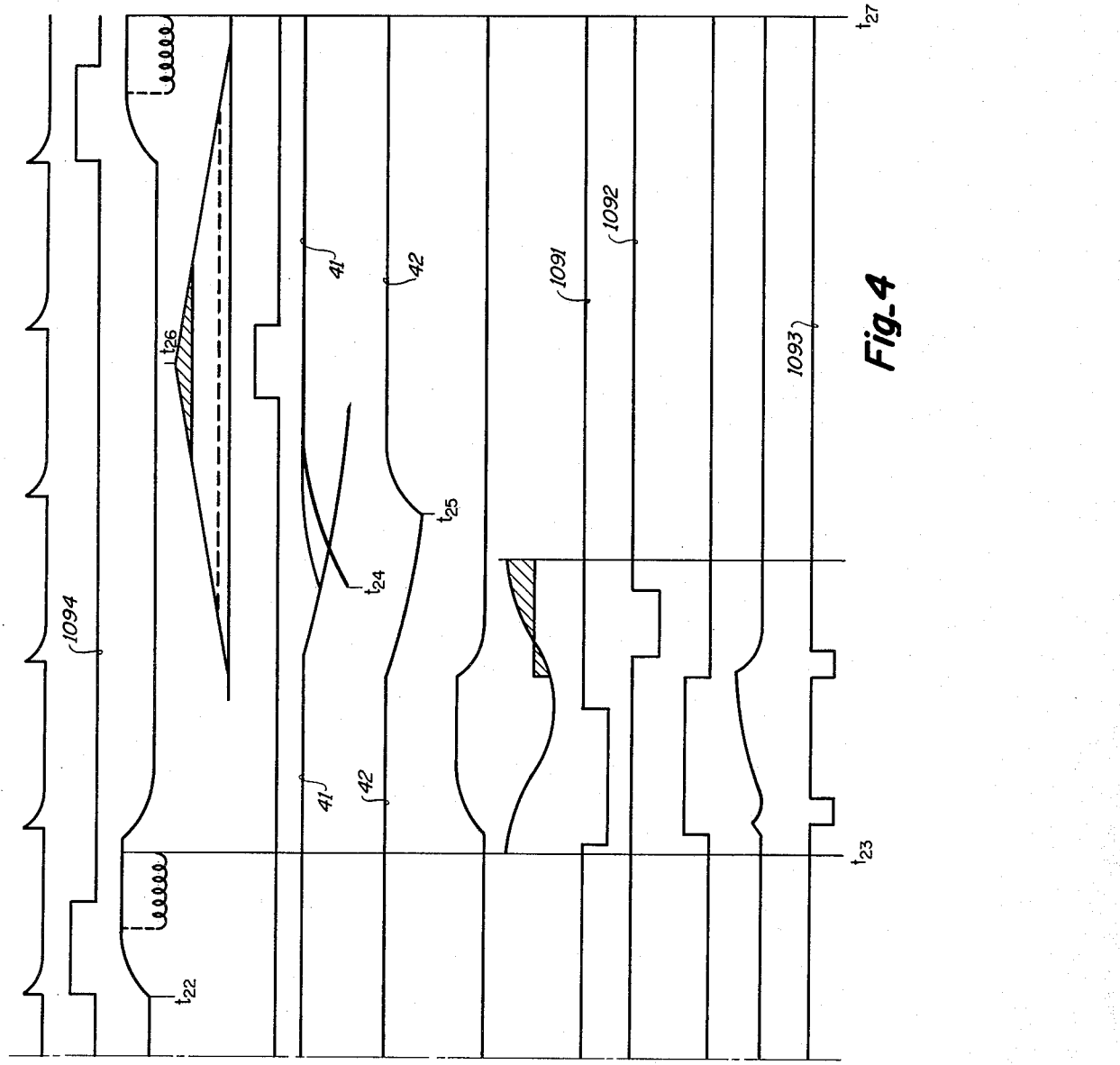

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a partial schematic diagram of a data processing system reader to typewriter mode circuitry incorporting the present invention; and FIGS. 2, 3 and 4 together are timing diagrams explanatory of the operation of the circuitry in FIG. 1.

Referring now to the drawings wherein a preferred embodiment of the invention is illustrated, there is shown within dotted enclosure 10 in FIG. 1 a schematic diagram of the invention incorporated in the reader to typewriter mode circuitry of copending application Serial No. 780,090. It will be understood that only so much of the circuitry of copending application Serial No. 780,090 as is necessary to understand the invention has been shown and bearing the same reference numerals as in said copending application.

As fully disclosed in said copending application, upon depression of a R/TW control button, R/TW relays 953 and 967 are energized. Energization of relay 953 connects binary level brushes 597 to corresponding set up solenoids 1, 2, 4, 8, N and A of a translator and connects a common brush 596 to ground through brush interrogate breakers 973.

The brush interrogate breakers are operable by a cam on a reader cam shaft 402 which is adapted to be cyclically coupled to a 30 revolutions/sec. motive source by means of a wrap spring clutch operable by a clutch control solenoid 397. Also mounted on the cam shaft 402 are cams adapted to operate clutch release breakers 1037, tape feed release breakers 1063 and translator interrogate breakers 988. In addition the cam shaft carries a tape feed drive arm (not shown) operable in combination with a tape feed solenoid 541 to rotate a feed drum 594 as fully described in said copending application, whereby a coded tape is moved columnwise past the brushes 597.

Normally with the cam shaft at rest all the breakers except the translator interrogate breakers 988 are closed. With the brush interrogate breakers 973 closed the translator set up solenoids are immediately energized in accordance with the code pattern under the brushes 597. Closure of contacts 15 and 16 of relay 967 is adapted to connect power to a clutch delay circuit thyratron 1045 via the normally closed clutch release breakers 1037, and closure of contacts 9 and 10 of relay 967 is adapted to initiate a start pulse in lines 1018 and 1021. The clutch delay circuit comprises thyratron 1045 and triodes 1067 and 1068. The plates of triodes 1067 and 1068 are connected to a plate supply voltage source 1052. The connections between the elements of tubes 1045, 1067 and 1068 are as shown with the plate of thyratron 1045 resistively coupled to the grid of triode 1068, and the plate of triode 1068 to the grid of triode 1067. The cathodes of thyratron 1045 and triode 1068 are connected to ground and the cathode of triode 1067 is connected through a cathode resistor 1073 to a −17.5 negative source terminal 1074. The cathode of triode 1067 is also connected through a resistor 1075 to an output conductor 1046 and to the anode of a clamping diode 1076 whose cathode is connected to a positive 17.5 volt terminal 1077. As will be understood triode 1068 is adapted for operation as a switch and triode 1067 for operation as a cathode follower. As also fully described in said copending application, whenever a typewriter mechanism is actuated, the contacts 61 and 62 of a switch associated therewith are closed whereby a signal is developed on a common output conductor 817 from an encoder. Conductor 817 is connected through a properly poled diode 1078 to a −17.5 volt terminal 1022 through resistor 1023 and through series diode 1024 and resistor 1025 as are the null and blank signals from translator output lines 975 via conductors 1081 and 1021.

The clutch delay circuit comprising tubes 1045, 1067 and 1068 is operable in combination with a timing switch 268 periodically operable by a three lobed cam mounted on the typewriter power roll to control and reduce the reader sensing rate to the optimum rate of typewriter operation, i.e. 12 characters per second. Closure of timing switch 268 is effective to fire a clutch solenoid control thyratron 1056 whereby the reader cam shaft is also cycled at a 12 character per second rate. Also shown in FIG. 1 is the reader secondary tape feed solenoid control thyratron 1055.

In accordance with the present invention a string of form C contacts, one per each level of the translator, are provided and adapted to be transferred by the set up solenoids. The stationary contacts 11 of each are shorted and connected to the movable contact 12 of the form C contact associated with the next higher level set up solenoid. The first movable contact is connected to a −17.5 volt terminal 13 and the stationary contacts of the form C contact associated with the highest level are connected to the grid 14 of a thyratron 15 through a current limiting resistor 16. The grid of thyratron 15 is also connected through a bias resistor 17 to a positive 17.5 voltage source terminal 18. As is apparent the grid potential can rise above the tube firing potential only when one or more of the string of form C contacts are transferring thereby removing momentarily the −17.5 volt potential from the grid. The cathode of thyratron 15 is grounded. The plate of thyratron 15 is connected through series resistors 21 and 22 and the coil of a relay 23, preferably a mercury relay, to a positive 100 volt terminal 24. The coil of relay 23 is connected in parallel with a diode 25 poled to carry the current resulting from the collapsing field of the relay coil when thyratron 15 ceases conduction. One plate 26 of a capacitor 27 is connected between resistors 21 and 22 and the other plate 28 is connected to ground through a resistor 29. Resistor 29 and capacitor 27 have a short time constant for reasons which will hereinafter appear. Relay 23 is adapted when energized to transfer a double form C contact comprising a movable mercury contact illustratively designated by reference numeral 31 and stationary contacts 1, 2, 3, and 4. Contact 1 is connected between capacitor 27 and resistor 29. Contact 3 is connected to the anode of a diode 32 whose cathode is adapted to be connected via conductor 34 to the clutch delay circuit input line 1021 and to the null-blank output line 1081. Contact 2 is connected to the grid of thyratron 15 and to the low side of relay 23 via a properly poled diode 33. Contact 4 is connected to the grid of tape feed control thyratron 1055 and to the input line 976 of the translator via contacts 7—8 and 19—20 of relays 967 and 953 respectively. The translator interrogate breakers 988 are connected in accordance with the present invention to movable contact 31 of relay 23 instead of directly to contacts 7—8 of relay 967 as shown by dotted connection 35 and described in said copending application. With thyratron 15 non-conducting the position of the movable contact 31 is as shown.

The operation of the R/TW mode with the circuitry of the instant invention will be explained with reference to FIG. 1 and particularly with reference to the timing diagrams shown in FIGS. 2–4. Depression of the R/TW button on the control panel will energize R/TW relays 953 and 967 as described in said copending application. As shown by timing curves 1091, 1092 and 1093 on the timing diagrams the reader clutch solenoid release breakers 1037, the brush interrogate breakers 973 and the reader tape feed solenoid release breakers 1063 are closed when the reader cam shaft 402 is at rest as represented by the time interval between $t_0$ and $t_1$ on the timing diagram. Also at time $t_0$ the 1, 2, 4, 8, N and A data readout brushes 597 are in registry with a column of holes in the tape to be read. Hence upon operation of the R/TW relay 953 contact stack, current will flow from the +100 volt terminal 974 through those translator set up solenoids and associated reader brushes in contact with the feed drum 594, through holes in the tape to be read, and to ground through the reader common brush 596 and the closed brush interrogate breakers 973. Energization of the set up solenoids (current curve 41) will complete a discrete path from translator input conductor 976 to one of the output conductors 975, the majority of which are connected to key puller solenoids 321.

Energization of the set up solenoids causes predetermined ones of the string of form C contacts to transfer thereby allowing, during transfer, the grid of thyratron 15 to go positive to thereby fire the tube. As a result relay 23 is energized (current curve 42) thereby connecting movable contact 31 with stationary contacts 1 and 4 thereof before a cycle of shaft 402 begins at time $t_1$.

Simultaneous operation of the contact stack of R/TW relay 967 causes current to flow from the +17.5 volt source terminal 1007 through contacts 9 and 10 thereof to negative 17.5 volt terminal 1011. The voltage developed across resistor 1012 will be differentiated by capacitor 1013 and resistor 1014 and the resulting positive pulse passed via conductors 1018 and 1021 through resistors 1023 and 1025 whereby thyratron 1045 will fire and triode 1068 will conduct. At the termination of the positive pulse thyratron 1045 will remain conducting and for as long as the reader clutch solenoid release breakers 1037 remain closed. The drop in plate voltage of thyratron 1045 upon conduction is effective to cut off amplifier triode 1068 only after termination of the pulse delivered over lines 1018 and 1021. When triode 1068 cuts off its plate voltage rises as is understood in the art, and this change is coupled to the grid of cathode follower triode 1067. Since triode 1067 is connected for operation as a cathode follower, as its grid goes positive its cathode tries to follow. The voltage on switch contact 272 however is clamped to approximately +17.5 volts by means of diode 1076. With the typewriter turned on, rotation of the power roll thereof periodically closes the typewriter timing switch contacts 271 and 272 over the intervals shown by timing curve 1094; closure of contacts 271 and 272 being shown as occurring at time $t_0$ in FIG. 2. Closure of the typewriter timing switch contacts 271 and 272 at time $t_0$ therefore impresses a signal across resistor 1051 whereby the grid of the reader clutch solenoid control thyratron 1056 rises above the cut off potential and the thyratron fires at the time $t_0$. The current (curve 1095) through the clutch solenoid 397 builds up whereby the clutch spring wraps and at time $t_1$ a cycle of the reader cam shaft 402 will begin. At a time $t_2$ corresponding to 15° shaft rotation the reader clutch solenoid release breakers 1037 will be opened by one of the cams on the reader cam shaft thereby cutting off thyratron 1056 and thyratron 1045. At a time $t_3$ corresponding to 25° shaft rotation the translator interrogate breakers 988 are closed by one of the cams on the reader cam shaft for a predetermined time interval as shown by curve 1096 thereby energizing the translator by connecting input conductor 976 thereof to the +100 volt source terminal 987, the current path being through contacts 31 and 4 of relay 23, contacts 7 and 8 of relay 967, conductors 994, 1001, and contacts 19 and 20 of relay 953. Closure of the translator interrogate breakers 988 simultaneously through connection of conductors 1001, 994 and 1002, causes the grid of the reader tape feed thyratron 1055 to rise above cut off potential whereby thyratron 1055 fires and the current in the secondary tape feed solenoid 541 begins to build up as shown by current curve 1097. The 100 volts applied to capacitor plate 28 via contact 1 of relay 23 causes a positive pulse on the other plate which is of such short duration as not to release relay 23. At time $t_4$ corresponding to 45° cam shaft rotation however the tape feed release breakers 1063 open, cutting off thyratron 1055. During the interval between $t_3$ and $t_4$ the tape feed drive arm as explained in said copending application is ineffective to cause the reader feed drum 594 to rotate since current (curve 1097) in secondary solenoid 541 at time $t_4$ is not sufficiently built up to restrain its armature. Meanwhile current flowing through the translator energizes a key puller solenoid 321 at time $t_3$ whereby the current flowing therein (curve 1098) is sufficiently built up at time $t_6$ to effect a type action at time $t_9$ as explained in said copending application; the type action motion being shown by curve 1101. At time $t_5$ the tape feed release breakers 1063 reclose and since the translate interrogate breakers 988 are still closed, thyratron 1055 refires and the current in the tape feed solenoid 541 begins to build up again at time $t_5$. At a time $t_7$ corresponding to 180° of shaft rotation the current in solenoid 541 is sufficiently built up such that it is effective in combination with the tape feed drive arm, whose motion is illustrated by the sinusoidal curve in FIGURES 2, 3 and 4, to cause the reader feed drum to rotate at a time $t_8$ corresponding to 222° in the cam shaft cycle, and continue to rotate over the remainder of the cycle, even through after the tape begins to feed, the tape feed solenoid release breakers 1063 open at a time corresponding to 225° shaft rotation to cut off thyratron 1055. Breakers 1063 however reclose at a time corresponding to 255° of shaft rotation in preparation for the next cycle. At time $t_7$ it will be noted that the clutch release breakers 1037 reclose for reasons which will hereinafter be apparent and the translator interrogate breakers 988 open at a time corresponding to 215° shaft rotation.

The opening of the translator interrogate breakers at a time corresponding to 215° shaft rotation causes a negative transient on capacitor plate 26 which is effective to cut thyratron 15 off and to cause relay 23 to release movable contact 31 after cessation of current therein resulting from the decaying magnetic field of the relay coil. Movement of the tape to the next column of perforations causes the brushes riding the tape to encounter another six level hole combination at a time $t_{11}$ corresponding to 325° shaft rotation. It is to be noted here that the set up solenoids are not sufficiently deenergized to release their contacts during movement of the tape between columns, notwithstanding that the brush interrogate breakers are opened for an interval beginning at time $t_{10}$ and ending at time $t_{11}$ corresponding to 240° and 325° shaft rotation. This result stems from the fact that the relays are in parallel with diodes 36 which provide a path for the current induced in the solenoids as the fields surrounding the solenoid coils begin to decay. Inasmuch as this current is in the same direction as the steady state current the dropping out of the set up solenoids is delayed over the interval the brush interrogate breakers 973 are open. At the end of said interval the brushes are in registry with the next columnar hole combination.

If the hole combination now beneath the brushes at time $t_{11}$ has changed, the set up solenoids associated with holes will be energized or never allowed to be completely deenergized if previously energized as the case may be, and those not associated with holes, if previously energized, will be completely deenergized at time $t_{13}$. The change will be detected by the string of form C contacts and thyratron 15 will refire thereby causing the current through relay 23, which was effectively deenergized at time $t_{12}$ so as to release contact 31 while thyratron 15 was cut off, to build up again at a time between $t_{12}$ and $t_{13}$. Hence if a change is detected the movable contact 31 of relay 23 will move back to its actuated position prior to the start of another cycle. At time $t_{12}$ the reader drive shaft will come to rest and all the breakers operated thereby will be in their initial positions.

At a time $t_{14}$ switch contacts 61 and 62 associated with the typewriter action initiated at time $t_9$ will close over the interval shown by curve 1102 and the signal initiated thereby as explained in said copending application will be effective over conductor 817 to fire thyratron 1045 and render triode 1068 conductive; plate power being supplied via breakers 1037 reclosed at time $t_7$ in the first cycle. As long as switch contacts 61 and 62 are closed triode 1068 remains conducting. As soon as the switch contacts open triode 1068 will cut off due to the low plate potential of conductive thyratron 1045 whereby its plate voltage will rise and render cathode follower triode 1067 conductive. During the time the cathode follower remains conductive, i.e. as long as clutch release breakers are closed and thyratron 1045 is conducting, the typewriter timing switch breakers close thereby initiating another read cycle at time $t_{15}$. In the second cycle, since relay 23 was reenergized between times $t_{12}$ and $t_{13}$, when the translator interrogate breakers close the tape feed thyratron will be fired whereby the tape will feed and the tree will be interrogated whereby a type action will be initiated as before. When the translate interrogate breakers open thyratron 15 will cut off as before.

If the next column sensed at time $t_{16}$ has the same hole combination as the next preceding combination no change in the state of the set up solenoids will occur and no break will be detected by the string of form C contacts. Thyratron 15 will therefore not refire and relay 23 will be allowed to be completely deenergized at time $t_{17}$ (FIG. 3); its movable contact 31 thereby assuming the normal position shown. As before the type bar actuated will close switch contacts 61 and 62 associated therewith and condition the clutch delay circuit whereby upon closure of the typewriter timing breakers a third shaft cycle (FIG. 3) will begin at time $t_{18}$. When the translate interrogate breakers close in this cycle 100 volts will be applied to the clutch delay circuit refiring, at time $t_{19}$, thyratron 1045 which was cut off when the clutch release breakers opened at a time corresponding to 15° shaft rotation in the third cycle. 100 volts is also applied to the grid of delay thyratron 15 and to the lower side of relay 23 via diode 33 whereby thyratron 15 will fire but relay 23 will not be energized since both ends thereof will be connected to +100 volts. When the translate interrogate breakers reopen, 100 volts is removed from the low side of relay 23 and since thyratron 15 is conducting, relay 23 will be energized at time $t_{20}$ transferring contact 31 to its actuated position before the end of the third cycle at time $t_{21}$.

As is apparent during the third cycle the tape will not be fed nor will the translator be interrogated. Hence the typewriter will not be operated. However the clutch delay circuit was conditioned at time $t_{19}$ so that upon closure of TW breakers at time $t_{22}$ (FIG. 4) a fourth cycle of shaft 402 will begin at time $t_{23}$. In the fourth cycle, since relay contact 31 is in its actuated position, the tree set up in the first cycle at time $t_{11}$, which set up was not changed when the same data was sensed at time $t_{16}$ in the second cycle, will be interrogated, the tape fed as in the first cycle and the repeat character typed at time $t_{26}$. Hence when the same character or function is successively sensed the typewriter will operate at only six characters per second rather than the normal 12. The current through relay 23 is caused to start building up again at time $t_{25}$ as a result of a change in the data sensed at time $t_{24}$ over that sensed at time $t_{16}$ so that a type action or typewriter function will occur in the interval succeeding the fifth cycle beginning at time $t_{27}$ as explained above.

When a blank or null code combination is sensed, the translator is interrogated and the tape fed as hereinbefore described. However inasmuch as a null or blank is not associated with any typewriter mechanism, no key puller is connected to the null or blank output lines. In order then to condition the clutch delay circuit whereby another cycle will start upon closure of the typewriter timing breakers, the null and blank output lines are connected over conductor 1081 to the clutch delay circuit input line 1021. If a repeat blank or null is sensed, no change will be detected by the string of contacts and relay contact 31 will be in the initial position shown when the translate interrogate breakers close in the next cycle. However since the tree is set up for a null or blank as the case may be, the 100 volts applied to conductor 1021 via conductor 34 to condition the clutch delay circuit is also applied over conductor 1081, through the tree, conductor 976, relay contacts 19—20 of relay 953 and conductor 1001 to the grid of the tape feed control thyratron 1055 whereupon the tape will feed in the second cycle. As is apparent then the circuit configuration is such that no additional delay is inserted when a null or blank code is sensed successively two or more times as was the case when codes representing particular typewriter characters or functions were successively sensed.

It should be understood, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. A data processing system wherein data sensed from a record is adapted to automatically operate a typewriter, said system comprising cyclically operable means, record sensing means, record feeding means, circuit means responsive to said cyclically operable means for permitting successive data in a record to be sensed, fed and sensed in an initial cycle thereof and to be fed and sensed in subsequent cycles, and means for translating data initially sensed in said initial cycle into discrete signals whereby typewriter operation is effected, said circuit means including control means for rendering said translating and record feeding means ineffective in succeeding cycles whenever successively sensed data is the same.

2. A system as recited in claim 1 wherein said control means comprises a thyratron adapted to fire whenever successively sensed data differs, and a relay operable when said thyratron fires to effect energization of said record feeding means and operation of said typewriter whenever successively sensed data differs and to effect an artificial cycle whenever successively sensed data is the same.

3. In a data processing system including an electric typewriter, circuitry for automatically controlling the operation of said typewriter at a first predetermined rate in response to signals representative of data successively sensed from a record, and means for controlling the operation of said circuitry whereby operation of said typewriter is limited to a second predetermined rate whenever successively sensed data is the same, comprising means for monitoring successively sensed data to determine whether successively sensed data is the same or different, means responsive to said monitoring means for rendering said circuitry effective at said first rate when successively sensed data differs, and means for inhibiting said last named means over predetermined intervals when successively sensed data is the same, thereby to permit operation of said typewriter only at said second predetermined rate.

4. In a data processing system including an electric typewriter having a power roll, key puller solenoids adapted when energized to initiate operation of typewriter mechanisms, record sensing means, translating means for selectively connecting said key puller solenoids in circuit with a common terminal in response to signals representative of data successively sensed from a record, timing breakers periodically operable in synchronism with the typewriter power roll, record feed control means adapted when energized to effect record movement, cyclically operable means, means controlled by said cyclically operable means for energizing said record sensing means, said common terminal, and said record feed control means, whereby said record is sensed, a selected key puller solenoid is energized, said record is fed, and succeeding data is sensed in each cycle, means for initiating a cycle control signal each time a typewriter mechanism is operated, circuitry including said timing breakers operative in response to said cycle control signals for initiating a cycle of said cyclically operable means, and circuit means operative in response to signals representative of data sensed in each cycle for preventing the energization of said record feed control means and said common terminal in a cycle of said cyclically operable means immediately following an initial cycle and for effecting the initiation of a third cycle of said cyclically operable means whenever data successively sensed in said initial cycle is the same.

5. In a data processing system including an electric typewriter having a power roll, key puller solenoids adapted when energized to initiate operation of typewriter mechanisms, record sensing means, translating means for selectively connecting said key puller solenoids in circuit with a common terminal in response to signals representative of data successively sensed from a record, timing breakers periodically operable in synchronism with the typewriter power roll, record feed control means adapted when energized to effect record movement, cyclically operable means, means controlled by said cyclically operable means for energizing said record feed control means and said common terminal whereby a selected solenoid is energized and said record fed, means for initiating a cycle control signal each time a typewriter mechanism is operated, circuitry including said timing breakers operative in response to said cycle control signals for initiating a cyclic operation of said cyclically operable means, said translating means comprising a relay tree and set up solenoids responsive to said signals representative of data, a string of form C contacts, one associated with each set up solenoid, means for detecting changes in state of at least one of said contacts, means responsive to said last named means for energizing said record feed control means and said common terminal in response to detected changes, and means for inhibiting said last named means and for effecting the initiation of a succeeding cycle of said cyclically operable means whenever successively sensed data is the same.

6. In a data processing system including a record wherein data items are stored in parallel columns across the shorter dimension of said record, record feed control means adapted when energized to effect columnar feed of said record, means for sensing said data items, circuitry for energizing said record feed control means at a first rate when successively sensed data items differ and at a second slower rate when successively sensed data items are the same, said circuitry comprising means for detecting changes in data items successively sensed, contact means including a contact movable from a normal to an operative position, cyclically operable means for connecting a signal source to said movable contact over a predetermined interval, a thyratron connected to said detecting means and to said contact means operative in response to detected changes and to said signal source when no changes are detected, relay means operative in response to said thyratron for moving said contact to its operative position whereby said signal source is connected to said record feed control means, and means associated with said contact means when in normal position for inhibiting the operation of said relay means over said predetermined interval when no change in successively sensed data items is detected.

7. A system as recited in claim 6 wherein said means for detecting changes in data items successively sensed from said record comprises a plurality of solenoids selectively energizable by said means for sensing data items, and a string of shorted form C contacts, one associated with each of said solenoids.

8. In a data processing system including an electric typewriter having a power roll, key puller solenoids adapted when energized to initiate operation of typewriter mechanisms, and a record having code patterns representative of data perforated therein in transverse columns, cyclically operable means, means responsive to said cyclically operable means for sensing, feeding and sensing said record in an initial cycle of said cyclically operable means, means for selectively connecting said key puller solenoids in circuit with a common terminal in response to signals representative of data sensed from said record, timing breakers periodically operable in synchronism with the typewriter power roll, record feed control means adapted when energized to effect record movement, interrogating means controlled by said cyclically operable means for energizing said record feed control means and said common terminal after sensing the first data column, whereby a selected solenoid is energized and said record fed, means for generating a cycle control signal each time a typewriter mechanism is operated, circuitry including said timing breakers operative in response to said cycle control signals for initiating a cyclic operation of said cyclically operable means, means for monitoring changes in successively sensed code patterns, control means operative in response to said last named means for energizing said record feed control means and said common terminal in a succeeding cycle of said cyclically operable means when the second code pattern sensed in the initial cycle differs from the first pattern, whereby the solenoid selected in response to signals representative of said second code pattern will be energized and said record fed, and means for inhibiting said control means when the second code pattern sensed in the initial cycle is the same as the first pattern whereby the solenoid selected in response to signals representative of said second pattern will not be energized, said control means effecting the initiation of a third cycle of said cyclically operable means if said second code pattern is representative of the same data, said solenoid selected in response to signals representative of said second sensed code pattern being energized by said interrogating means in said third cycle.

9. A data processing system including an electric typewriter having a power roll, key puller solenoids for automatically operating key controlled mechanisms of said typewriter, means for generating cycle control signals each time a typewriter mechanism is operated, timing breakers periodically operable by the power roll of said typewriter, a cyclically operable shaft, means responsive to said cycle control signals and to the closure of said timing breakers for initiating cycles of said shaft, record sensing means, means for moving a record columnwise past said sensing means, said record having code patterns representative of data perforated in columns, translating means responsive to signals sensed by said sensing means for selecting one of said key puller solenoids for energization, first means operable by said cyclically operable shaft for sensing, feed, and sensing said record in an initial cycle, and for feeding and sensing said record in subsequent cycles, second means operable by said cyclically operable shaft for energizing key puller solenoids selected by said translating means, means for monitoring changes in successively sensed data, means responsive to said monitoring means for permitting the energization of said key puller solenoids when successively sensed data differs, and means for inhibiting said last named means thereby to prevent the energization of said key puller solenoids over a cycle of said cyclically operable shaft and for initiating an artificial cycle of said cyclically operable shaft if successively sensed data is the same.

References Cited in the file of this patent

UNITED STATES PATENTS

| | | |
|---|---|---|
| 2,448,842 | Tholstrup | Sept. 7, 1948 |
| 2,477,011 | Skinner | July 26, 1949 |
| 2,786,567 | Goetz | Mar. 26, 1957 |
| 2,865,487 | Hildebrandt | Dec. 23, 1958 |